| United States Patent Office | 3,466,799
Patented Sept. 16, 1969 |

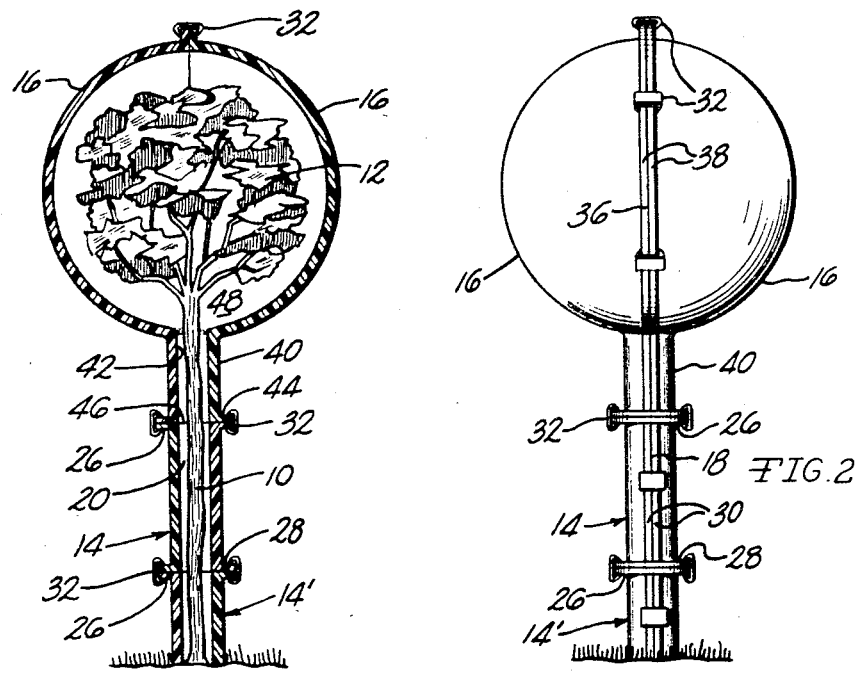
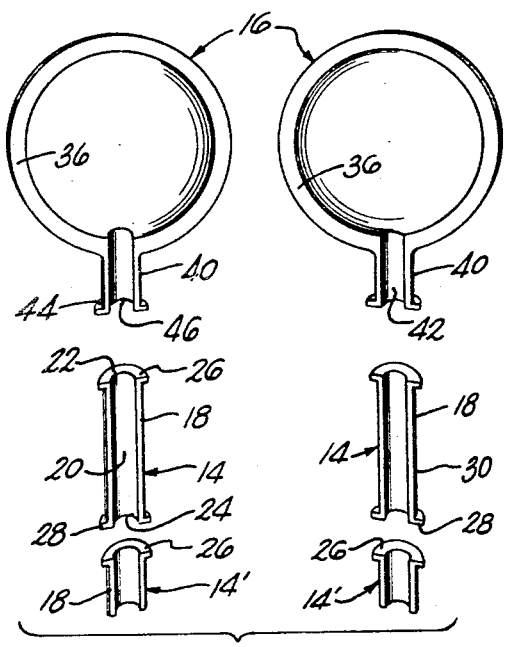
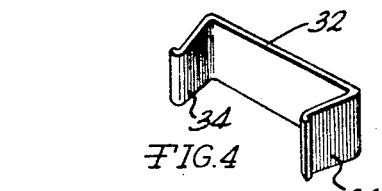
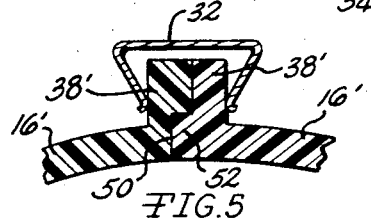
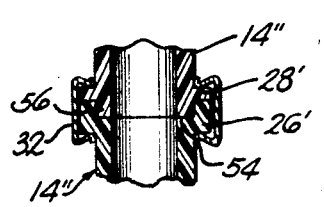

3,466,799
PROTECTIVE STRUCTURE FOR ROSE TREES AND THE LIKE
Vernard McComb Stilson, 199 W. Pearl St.,
Coldwater, Mich. 49036
Filed Dec. 22, 1966, Ser. No. 604,026
Int. Cl. A01g *13/02;* F16b *2/02, 2/20*
U.S. Cl. 47—21                7 Claims

ABSTRACT OF THE DISCLOSURE

A protective structure for plants, particularly suitable for use with long stemmed plants having primary foliage located upon the stem upper end. The covering consisting of a plurality of cylindrical segment portions adapted to encompass the stem upon being interconnected together, and bulbous foliage encompassing portions adapted to be affixed to the stem encompassing segments for protection of the foliage. The components of the covering are formed of a thermal insulating material.

---

It is common practice to protect plants from frost by placing a protective covering over the plant during those times when the plant may be subjected to freezing temperatures. Newspapers, inverted cup-shaped devices, flexible films and sheets, and inverted box-type housings have been used for such purposes. Generally, except for fruit trees, such as of the citrus variety, frost protection is normally limited to the smaller plant varieties such as roses, tomato plants, certain types of flowers, and other plants which may be readily covered by paper caps, bushel baskets, fabric sheeting or other conventional covering. Considerable difficulty is encountered in adequately protecting the larger size plants from frost damage. For instance, rose trees are several feet in height and create a problem when it is desired to protect such rose trees from frost with conventional coverings.

It is a basic object of the invention to provide a protective covering which may be used with long-stemmed plants having foliage located at the upper end of the stem, as is the case with a rose tree, wherein the protective structure shields the plant from frost damage, yet does not harm the plant nor impose any weight on the plant.

An additional object of the invention is to provide a protective structure for long-stemmed plants wherein the protective structure is of a substantially rigid construction, protects the plant from extreme temperature variations, and may be readily attached to and removed from the plant.

A further object of the invention is to provide a protective structure for long-stemmed plants which can be used to shield and protect the plant during shipment.

An additional object of the invention is to provide a protective structure for long-stemmed plants having foliage located at the stem upper end wherein the protective structure is versatile in its use and identical components may be employed to form a protective structure for a wide variety of sizes of plants.

Yet a further object of the invention is to provide a protective structure for long-stemmed plants wherein the components of the protective structure may be quickly and easily assembled to form a substantially rigid enclosure for the plant, and wherein the protective structure is of low cost and is lightweight.

Another object of the invention is to provide protective structure for long-stemmed plants wherein stem-encompassing segments and foliage-accompanying segments are assembled to provide an effective enclosure for the plant capable of protecting the plant from adverse weather conditions.

These and other objects of the invention arising from the details and relationships of the components of an embodiment thereof will be apparent from the following description and accompanying drawings wherein:

FIG. 1 is an elevational, diametrical, sectional view of a rose tree encompassed within protective structure in accord with the invention, FIG. 2 is an elevational view of the assembled protective structure of FIG. 1, FIG. 3 is a perspective exploded view of the components of the protective structure of FIGS. 1 and 2, FIG. 4 is a perspective view of a retaining clip which may be employed with the protective structure of the invention, FIG. 5 is an enlarged, detail, sectional view of a modified foliage segment flange embodiment, and retaining clip associated therewith, and FIG. 6 is an enlarged, detail, elevational, sectional view of a variation in the construction of the ends of stem segments in accord with the invention.

While the invention is particularly suitable with long-stemmed plants, such as rose trees, it will be appreciated that the apparatus of the invention may be employed with any plant to which the structure is adaptable. FIG. 1 illustrates a typical rose tree which includes an elongated stem 10 having a foliage 12 at the upper end thereof upon which the rose blossoms appear.

To encompass the entire rose tree, two types of segments are employed. The hereinafter designated stem segments 14 are employed to encompass the major portion of the stem and the foliage segments 16 encompass the foliage and the upper portion of the stem.

Preferably, the stem-encompassing segments are of an elongated, semicyclindrical configuration, as is best appreciated from FIG. 3. The stem segments 14, preferably, are molded from a substantially rigid, lightweight material, such as polyurethane, styrene or molded styrene beads, which has closed cells and is of an efficient thermal insulating character. The segments 14 include longitudinally extending edges 18 which are diametrically related to the transverse, cross-sectional configuration of the segment inner surface 20. The upper end 22 and the lower end 24 of the segments are provided with outwardly, radially disposed flanges 26 and 28, respectivey. In the embodiment shown in FIGS. 1 through 3, the end surfaces of the segments 14 which are formed upon the end flanges are planer and uninterrupted. Flanges 30 may also be located adjacent the edges 18 extending in a radial direction between the upper and lower flanges, FIG. 2, to permit retaining clips to maintain the edges 18 of asembled segments in sealed engaging relationship.

The stem segments 14 are asembled in a manner as shown in FIGS. 1 through 3. The upper flanges 26 of a pair of the segments 14 are aligned in the same plane, which will result in the lower flanges 28 likewise being located in a common plane, in that each of the stem segments are of identical configuration and dimension. The edges 18 are brought into engagement with each other and the assembled segments will define a tubular configuration having an inner diameter defined by the inner segment surfaces 20. In FIGS. 1 through 3, the lowermost stem segments 14' have been severed at a point below the upper flange 26, in that the length of the illustrated rose tree stem 10 is not such that two complete lengths of stem segments can be employed. Retaining clips 32, such as shown in FIG. 4, which may be made of spring steel, are employed to maintain the ends and edges of the assembled stem segments in contiguous relationship. The width separating the fingers 34 of the retaining clip is such as to bridge and resiliently grip the end flanges and the edge flanges of the stem segments to maintain the tubular configuration resulting from the assembly of the stem segments.

The foliage of the plant is protected by a pair of bulbous foliage segments 16 which are likewise molded of a lightweight, substantially rigid, thermal insulating material, such as polyurethane, styrene or styrene beads. The foliage segments 16 are generally of a hemispherical configuration and include diametrically related edges 36 from which radially extends a flange 38. The edges 36 are planar in configuration. Neck portions 40 extend from the hemispherical portion of the segments 16 and are of a shape substantially corresponding to that of the stem segments 14. The neck portions 40 include an inner cylindrical surface 42 and a lower edge defined by flanges 44. A lower surface 46 is defined by the flanges 44 for engagement with the upper end 22 of the uppermost stem segments 14.

The foliage segments 16 are assembled, as will be apparent from FIG. 2, by retaining clips 32 engaging the edge flanges 38. In this manner, the hemispherical portions of the foliage segments will define a spherical chamber 48 in which the foliage 12 is encompassed and the neck portions 40 will form a tubular configuration receiving the uppermost portion of the stem 10. The neck portion flanges 44 are connected to the uppermost stem segment flange 26 by retaining clips 32, as will be apparent from FIGS. 1 and 2.

Thus, it will be appreciated that when the stem segments 14 and the foliage segments 16 are assembled, the resulting protective structure will closely conform to that of the plant and efficiently protect the plant from temperature changes. In that the material of the segments is substantially rigid, it is self-supporting and, thus, the weight of the segments will not be imposed upon the plants. As the protective structure conforms to the configuration of the plant, a dead air space surrounds the plant and this will also minimize damage to the plants due to winds.

The structure of the invention may also be used to protect stemmed plants during shipping or transporting. For instance, a pair of the foliage segments 16 may be used to encompass the room structure of the plant, as well as the foliage, and when using such an arrangement, the stem segments will not be severed, as shown in FIGS. 1 through 3, to insure that a lower flange 28 exists on the stem segment furtherest from the foliage so that the hemispherical segments encompassing the root structure can be affixed to the stem segments.

FIGS. 5 and 6 show variations in the formation of the edges of the segments. In FIG. 5 hemispherical foliage segments 16' are illustrated as including flanges 38'. The left segment 16' is recessed at 50 and the right segment 16' is provided with a ridge or tongue 52 which is closely received within the recess 50. In this manner, the tongue and recess provided a closer fitting and stronger interconnection between the segments than is achieved with the planar segment edges 36 of the embodiments of FIGS. 1 through 3. In a similar manner, FIG. 6 illustrates a variation in the configuration of the stem or neck portion, flange and segment arrangement to increase the strength and interconnection characteristics. The stem segments 14' include flanges 26' and 28', respectively. The segment lower end is recessed at 54 while the upper segment is provided with a tongue 56 at its upper end adapted to be received within the recess 54. The annular, concentric configuration of the recess 54 and tongue 56 will aid in the assembly of the segments 14', and increase the surface area and strength characteristics of the connection between the segment ends.

The use of the spring clips 32 permits the stem segments to be readily attached together and to the foliage segments. As the protective structure will often be placed on the plants in the evening and removed in the morning after the danger of frost has disappeared, it will be appreciated that the easy assembly and disassembly of the structure relative to the plant is of importance. The structure can be used many times without damage to the segments, and the flange-to-flange connection between the segments insures a rigid joint which is weather resistant and insect deterring.

It is appreciated that various modifications to the invention may be apparent to those skilled in the art without departing from the spirit and scope thereof, and it is intended that the invention be defined only by the following claims.

I claim:

1. A protective structure for plants having an elongated stem and foliage at the end of said stem comprising, in combination, a plurality of substantially rigid, lightweight, elongated stem-encompassing segments of thermal insulating material each having upper and lower ends and longitudinally extending edges, said segments having a transverse cross section comprising a portion of the circumference of a tubular configuration whereby a plurality of said segments may be assembled wherein the upper ends of said segments are disposed in a first plane and the lower ends of said segments are disposed in a second plane, said edges of said segments engaging an edge of the adjacent segment to define a tubular member adapted to encompass the plant stem, means maintaining the edges of adjacent segments in engaging relation to define said tubular member, foliage-encompassing segments of a bulbous configuration each including stem segment engaging portions and edges, said foliage segments defining an enlarged foliage protecting and receiving chamber upon said foliage segments being interconnected at their edges, means adapted to maintain said foliage segment edges of adjacent foliage segments in engaging relation, and connection means connecting said foliage encompassing segments to the adjacent segments.

2. A protective structure as in claim 1 wherein said means adapted to maintain said foliage segment edges of adjacent foliage segments in engaging relation include outwardly disposed flanges defined on said foliage segments at said edges thereof, and retaining means engaging said flanges maintaining the engagement of engaging foliage segment edges.

3. A protective structure as in claim 1 wherein said foliage-encompassing segments are hemispherical in configuration, each having a concave inner surface and a convex outer surface.

4. A protective structure as in claim 3 wherein each of said foliage segments includes a radially extending neck portion defining a portion of the edge of the associated segment, said neck portion being of a semicylindrical, transverse cross section of a configuration comprising one-half of the tubular configuration defined by said stem segments, and having a lower end, said connection means being defined on said neck portion lower end permitting attachment of said neck portion lower end to the upper end of a stem segment.

5. A protective structure as in claim 4 wherein said connection means defined in said neck portion lower end includes an outwardly disposed flange of a configuration corresponding to the configuration of a stem segment upper end.

6. A protective structure for plants having an elongated stem and foliage at the end of said stem comprising, in combination, a plurality of substantially rigid, lightweight, elongated stem-encompassing segments of thermal insulating material each having upper and lower ends and longitudinally extending edges, outwardly extending flanges defined on said ends lying in a plane perpendicularly disposed to the length of the associated segment, outwardly radially extending flanges defined on said segment edges, said segments having a transverse cross section comprising a portion of the circumference of a tubular configuration whereby a plurality of said segments may be assembled wherein the upper ends of said segments are disposed in a first plane and the lower ends of said segments are disposed in a second plane, said edges of said segments engaging an edge of the adjacent segment to define a tubular member adapted to encompass the plant stem, and retaining means engaging the adjacent segment edge flanges maintaining the edges of adjacent segments in engaging relation to define said tubular member.

7. In a protective structure as in claim 6 wherein retaining means engage the flanges of said segment ends for permitting interconnection of the lower ends of segments to be connected to the upper end of segments disposed immediately therebelow whereby a tubular member is defined having an axial length greater than the axial length of a single segment.

References Cited

UNITED STATES PATENTS

| | | | |
|---|---|---|---|
| 404,757 | 6/1889 | Webber | 47—23 |
| 1,544,322 | 6/1925 | Kellermann | 47—31 |
| 2,643,139 | 6/1953 | Hamilton | 285—406 |
| 3,052,062 | 9/1962 | Boyle | 47—37 |
| 3,091,487 | 5/1963 | Gallagher et al | 285—406 XR |
| 3,218,759 | 11/1965 | Barrons | 47—30 |

FOREIGN PATENTS 838,068  6/1960  Great Britain

ROBERT E. BAGWILL, Primary Examiner

U.S. Cl. X.R.

287—130